(12) United States Patent
Cheon et al.

(10) Patent No.: US 9,118,071 B2
(45) Date of Patent: Aug. 25, 2015

(54) RECHARGEABLE BATTERY

(75) Inventors: Sang-Eun Cheon, Suwon-si (KR);
Tatsuya Hashimoto, Suwon-si (KR);
Seok-Yoon Yoo, Suwon-si (KR);
Chi-Young Lee, Suwon-si (KR);
Dong-Wook Kim, Suwon-si (KR);
Jong-Seok Moon, Suwon-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 1026 days.

(21) Appl. No.: 12/720,610

(22) Filed: Mar. 9, 2010

(65) Prior Publication Data

US 2010/0233519 A1 Sep. 16, 2010

(30) Foreign Application Priority Data

Mar. 11, 2009 (KR) ........................ 10-2009-0020860

(51) Int. Cl.
*H01M 2/12* (2006.01)
*H01M 2/34* (2006.01)
*H01M 2/06* (2006.01)
*H01M 10/04* (2006.01)

(52) U.S. Cl.
CPC ........ *H01M 2/34* (2013.01); *H01M 2/06* (2013.01); *H01M 2/345* (2013.01); *H01M 10/0431* (2013.01)

(58) Field of Classification Search
CPC ......... H01M 2/12; H01M 2/34; H01M 2/345; H01M 2/06
USPC ...................................... 429/53–56, 161–187
See application file for complete search history.

(56) References Cited

U.S. PATENT DOCUMENTS 6,569,562 B1 * 5/2003 Spillman et al. ............... 429/163
2004/0131931 A1 * 7/2004 Anglin et al. .................. 429/162

(Continued)

FOREIGN PATENT DOCUMENTS

FR 2908740 A1 * 5/2008
JP 11-224659 A 8/1999

(Continued)

OTHER PUBLICATIONS

David Linden, Handbook of Batteries, 2002, McGraw-Hill, 3rd Edition, Chapter 1.4, p. 21; Chapter 4.8-4.9, pp. 104-105; Chapter 14.17, p. 344; Chapter 14.38, p. 365; Chapter 20.5, p. 525.*

(Continued)

*Primary Examiner* — Milton I Cano
*Assistant Examiner* — Jimmy K Vo
(74) *Attorney, Agent, or Firm* — Christie, Parker & Hale, LLP

(57) ABSTRACT

A rechargeable battery configured to stably and easily interrupt a current includes: an electrode assembly including a positive electrode, a negative electrode, and a separator between the positive electrode and the negative electrode; a case containing the electrode assembly therein and having a first opening at one end thereof; and a first plate coupled to the case and sealing the first opening, the first plate electrically connected to the electrode assembly, wherein the first plate includes a wrinkle portion configured to deform for disconnecting the first plate from the electrode assembly when an internal pressure of the case is greater than a reference pressure.

12 Claims, 7 Drawing Sheets

(56) References Cited

U.S. PATENT DOCUMENTS

| | | | |
|---|---|---|---|
| 2005/0053833 A1* | 3/2005 | Hayashida et al. | 429/209 |
| 2005/0153194 A1* | 7/2005 | Kimura et al. | 429/53 |
| 2009/0148753 A1* | 6/2009 | Jeon | 429/53 |

FOREIGN PATENT DOCUMENTS

| | | | |
|---|---|---|---|
| JP | 2006-099977 | | 4/2006 |
| JP | 2008-130482 | | 6/2008 |
| JP | 2008-171678 | A | 7/2008 |
| JP | 2008171678 | A * | 7/2008 |
| KR | 10-2003-0044510 | A | 6/2003 |

OTHER PUBLICATIONS

FR 2908740 Al, English Translation, Obtained and Translated Jul. 23, 2014 via EPO and Google.*

Patent Abstracts of Japan and English machine translation of Japanese publication No. JP 2008-171678 A.

Patent Abstracts of Japan and English machine translation of Japanese publication No. JP 11-224659, Published Aug. 17, 1999.

KIPO Office action dated Sep. 20, 2010 in priority Korean application No. 10-2009-0020860, listing the cited references in this IDS.

\* cited by examiner

RECHARGEABLE BATTERY

CROSS-REFERENCE TO RELATED APPLICATION

This application claims priority to and the benefit of Korean Patent Application No. 10-2009-0020860 filed in the Korean Intellectual Property Office on Mar. 11, 2009, the entire content of which is incorporated herein by reference.

BACKGROUND

1. Field

Embodiments of the present invention relate to a rechargeable battery, and more particularly, to a rechargeable battery having a plate coupled to an opening of a case.

2. Description of the Related Art

Unlike a primary battery that cannot be recharged, a rechargeable battery (i.e., a secondary battery or a secondary cell) can be repeatedly charged and discharged. Low-capacity rechargeable batteries are typically used for small portable electronic devices such as mobile phones, notebook computers, camcorders, and the like, and large-capacity rechargeable batteries are commonly used as a power source for driving a motor of a hybrid electric vehicle and the like.

A high-power rechargeable battery using a non-aqueous electrolyte with high energy density has recently been developed. For example, the high-power rechargeable battery is constructed as a high-capacity rechargeable battery having a plurality of rechargeable cells coupled to each other in series such that it can be used as a power supply for driving motors in electric vehicles requiring high power.

Furthermore, one high-capacity rechargeable battery is commonly formed with a plurality of rechargeable cells coupled to each other in series and may have a cylindrical shape or a prismatic shape.

The prismatic rechargeable battery includes an electrode assembly with positive and negative electrodes and a separator interposed between the two electrodes, a case mounting the electrode assembly therein, a cap plate fitted to the case to seal the case and having terminal holes, and terminals inserted into the terminal holes of the cap plate and protruding to the outside of the case.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a prismatic rechargeable battery configured to stably reduce or prevent overcharging.

A rechargeable battery according to an exemplary embodiment of the present invention includes: an electrode assembly including a positive electrode, a negative electrode, and a separator between the positive electrode and the negative electrode; a case containing the electrode assembly therein and having a first opening at one end thereof; and a first plate coupled to the case and sealing the first opening, the first plate electrically connected to the electrode assembly, wherein the first plate includes a wrinkle portion configured to deform for disconnecting the first plate from the electrode assembly when an internal pressure of the case is greater than a reference pressure.

The first plate may include a supporting portion welded to the case near the first opening and a connection portion electrically connected to the electrode assembly, and the wrinkle portion may be between the supporting portion and the connection portion. The wrinkle portion may be contiguous around a periphery of the connection portion.

The electrode assembly may include an uncoated region having no active material coating, and the uncoated region may be welded to the first plate. The uncoated region may have a notch, and the uncoated region may be configured to break and disconnect the first plate from the electrode assembly when the first plate deforms.

The rechargeable battery may include a lead member electrically connected to the electrode assembly and welded to the first plate, and the lead member may include a notch. The lead member may be configured to break and disconnect the first plate from the electrode assembly when the first plate deforms.

The wrinkle portion may have a thinner thickness than a thickness of another portion of the first plate adjacent the wrinkle portion.

The case may have a second opening at another end thereof opposite the first opening, and the rechargeable battery may further include a second plate coupled to the case and sealing the second opening, and an electrode terminal inserted through the second plate and electrically connected to the electrode assembly. The second plate may have a wrinkle portion configured to deform for disconnecting the electrode terminal from the electrode assembly.

The wrinkle portion may include at least one protrusion and at least one depression, the at least one protrusion and the at least one depression adjacent one another. The at least one protrusion may include a plurality of protrusions, and the at least one depression may include a plurality of depressions, protrusions of the plurality of protrusions and depressions of the plurality of depressions adjacent one another.

A rechargeable battery may further include an insulator on an inner surface of the case near the first plate.

The case may have a prismatic shape.

A rechargeable battery according to another exemplary embodiment of the present invention includes: an electrode assembly including a positive electrode, a negative electrode, and a separator between the positive electrode and the negative electrode; a case containing the electrode assembly therein and having an opening at one end thereof; a plate coupled to the case and sealing the opening; and a terminal inserted through the plate and electrically connected to the electrode assembly, wherein the plate includes a wrinkle portion configured to deform for disconnecting the terminal from the electrode assembly when an internal pressure of the case is greater than a reference pressure.

The wrinkle portion may be arranged in a circumferential direction around the terminal.

The wrinkle portion may include at least one protrusion and at least one depression, the at least one protrusion and the at least one depression adjacent one another.

The electrode assembly may have a notch.

According to an exemplary embodiment of the present invention, a cover plate of a case has a wrinkle portion that is deformable according to an internal case pressure such that a current may be easily interrupted under an increase of the internal case pressure.

DESCRIPTION OF REFERENCE NUMERALS INDICATING SOME ELEMENTS IN THE DRAWINGS

Figure 1:
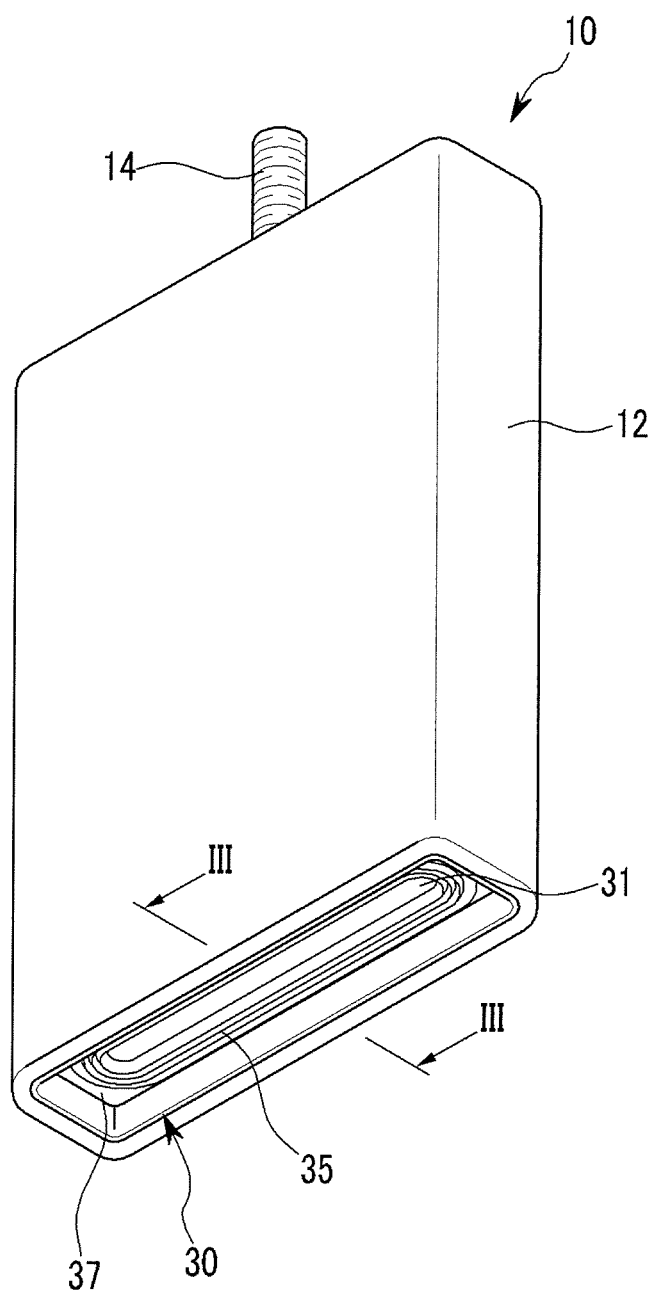
FIG. 1 is a perspective view of a rechargeable battery according to an exemplary embodiment of the present invention.

10: rechargeable battery 12: case
125: first opening 126: second opening
128: insulating layer 13: second plate
14: terminal 16: gasket
17: current collecting plate 20: electrode assembly
21: positive electrode 211: positive electrode uncoated region
22: negative electrode 221: negative electrode uncoated region
23: separator 30: first plate
31: connection portion 35: wrinkle portion
37: supporting portion 371: rib
50: lead member 51: notch

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Like reference numerals designate like elements throughout the specification.

Figure 2:
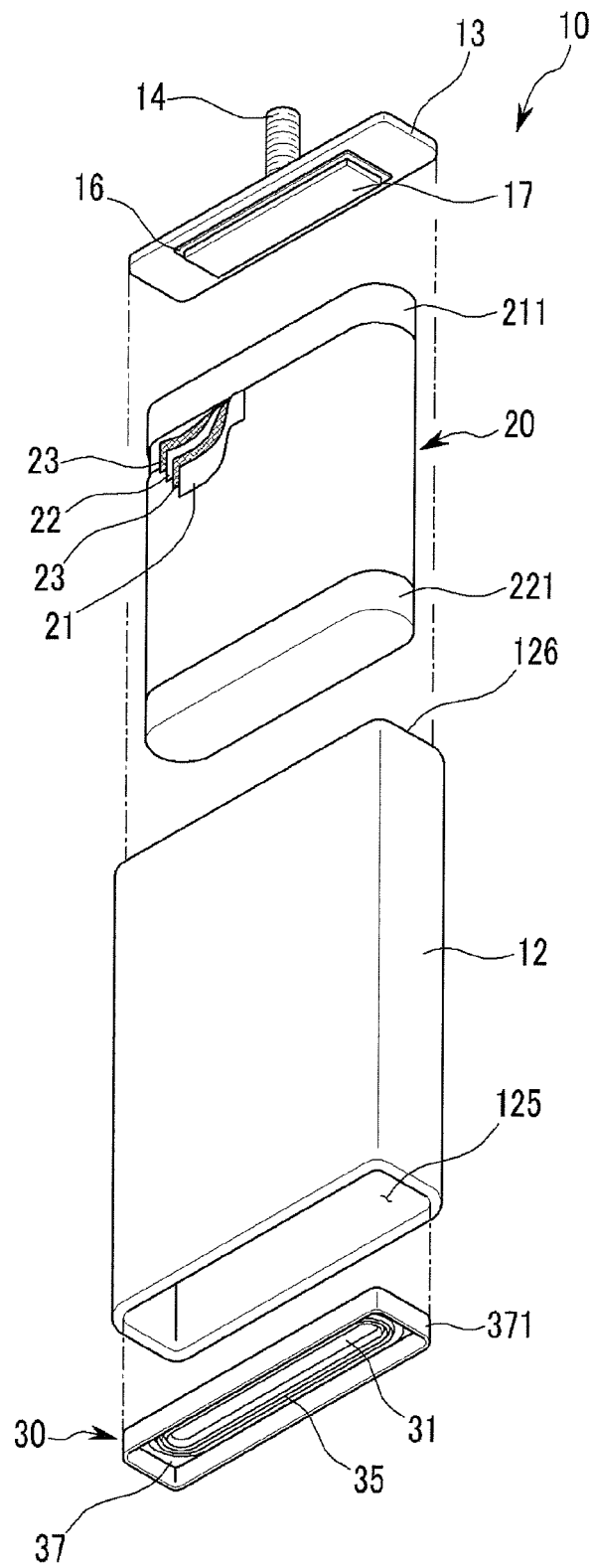
FIG. 2 is an exploded perspective view of the rechargeable battery of FIG. 1.

FIG. 1 is a perspective view of a rechargeable battery 10 according to an exemplary embodiment of the present invention, and FIG. 2 is an exploded perspective view of the rechargeable battery 10.

Referring to FIGS. 1 and 2, the rechargeable battery 10 includes an electrode assembly 20 having positive and negative electrodes 21 and 22 wound together with an insulating separator 23 interposed therebetween, a case 12 containing the electrode assembly 20 therein, at least one terminal 14 electrically connected to the electrode assembly 20, and a first plate 30 fitted to a first opening 125 formed in the case 12.

The electrode assembly 20 is formed by winding the positive and negative electrodes 21 and 22 while interposing the separator 23 therebetween. After being wound, the electrode assembly 20 is flatly pressed into a plate-like or similar shape.

A positive electrode uncoated region 211 that does not have any positive electrode active material is formed at one end of the electrode assembly 20, and a negative electrode uncoated region 221 that does not have any negative electrode active material is formed at the other end of the electrode assembly 20.

The negative electrode 22 has a structure in which a negative electrode active material is coated on a current collector formed of copper or aluminum or the like, and the positive electrode 21 has a structure in which a positive electrode active material is coated on a current collector formed of copper or aluminum or the like.

With reference to FIG. 2, according to one exemplary embodiment, the positive electrode uncoated region 211 is arranged at the upper side of the electrode assembly 20, and the negative electrode uncoated region 221 is arranged at the lower side of the electrode assembly 20, but the present invention is not limited to this illustrated arrangement. That is, in alternative embodiments, the positive electrode uncoated region 211 may be arranged at the lower side of the electrode assembly 20, and the negative electrode uncoated region 221 may be arranged at the upper side of the electrode assembly 20.

In one embodiment, the case 12 is formed having a roughly quadrangular-shaped tubular structure such that the first opening 125 is formed at the bottom end of the case 12 and a second opening 126 is formed at the top end thereof. According to an exemplary embodiment, as shown in FIGS. 1 and 2, the case 12 is formed as a prismatic type. However, embodiments of the present invention are not limited to a prismatic type, and alternatively, the case 12 may be formed having various shapes such as a cylindrical type.

The first plate 30 is inserted into the first opening 125, and the first plate 30 is attached to the negative electrode uncoated region 221 via welding. A second plate 13 is inserted into the second opening 126, and the terminal 14 that is electrically connected to the electrode assembly 20 is installed such that it penetrates through the second plate 13.

The first plate 30 includes a connection portion 31 welded to the negative electrode uncoated region 221, a supporting portion 37 disposed at the edge of the first plate 30 and contacting the case 12, and a wrinkle portion 35 positioned between the connection portion 31 and the supporting portion 37.

The supporting portion 37 extends from the wrinkle portion 35 to the portion contacting the case 12. A rib 371 formed around the outer edge of the first plate 30 contacts the case 12. The rib 371 is bonded to the case 12 via welding, thereby sealing the case 12. As such, the rib 371 is formed at the edge of the first plate 30, and although the first plate 30 may be thin, the case 12 may be stably sealed.

Figure 3A:
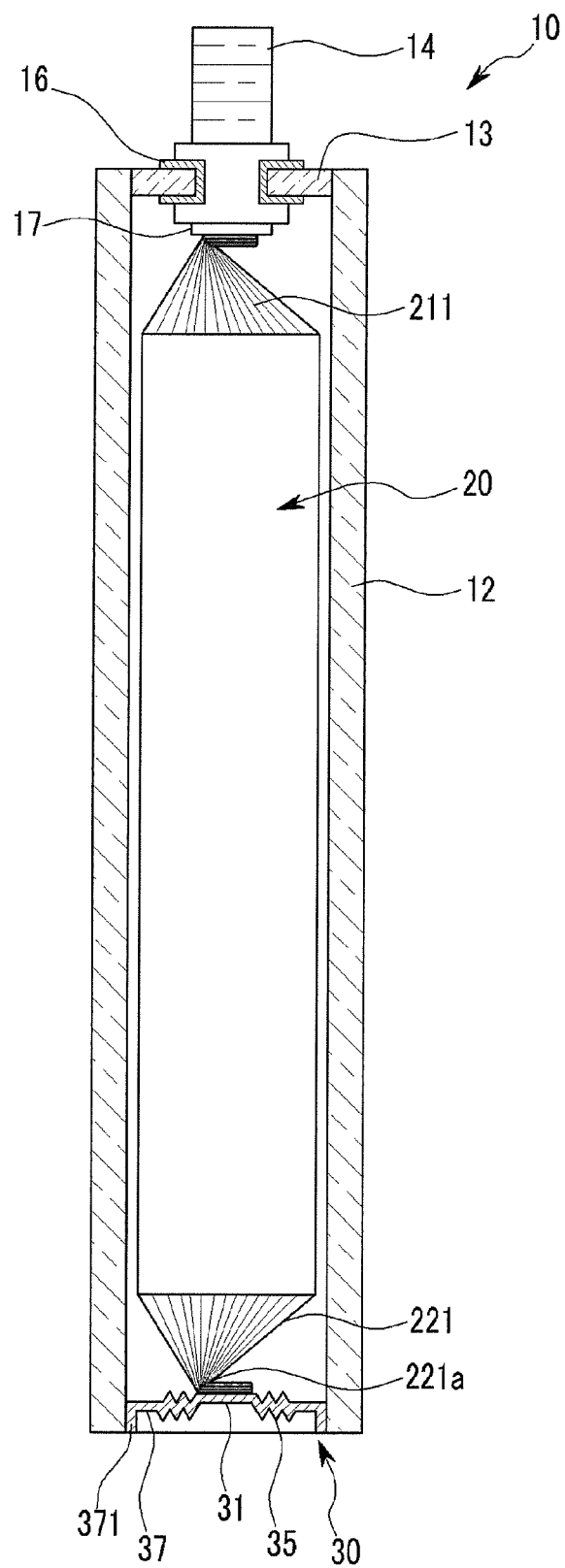
FIG. 3A is a cross-sectional view of the rechargeable battery of FIG. 1 taken along the line III-III showing a wrinkle portion of the rechargeable battery in a non-expanded state.

The wrinkle portion 35 is formed to be bent, and a plurality of protrusions and depressions (or convex and concave portions) are arranged adjacent to each other such that a horizontal section thereof has an approximate triangle wave shape (see FIG. 3A), such as, for example, an accordion-type shape. Accordingly, a surface adjacent one of the convex portions becomes concave, and a surface adjacent one of the concave portions becomes convex. According to one exemplary embodiment, as illustrated in FIG. 3A, the wrinkle portion 35 has the triangle wave shape, but alternative embodiments of the present invention are not limited to this shape. Rather, the wrinkle portion 35 may be made having various cross-sectional shapes such as sine wave and square wave shapes.

Also, in an exemplary embodiment, the wrinkle portion 35 is contiguously formed around a periphery of the connection portion 31, such that the connection portion 31 is enclosed by the wrinkle portion 35. As a result of the above-described configuration, the wrinkle portion 35 may be easily flattened, or expanded.

The connection portion 31 is arranged at a central part of the first plate 30, and the negative electrode uncoated region 221 is connected to the connection portion 31 by welding.

Accordingly, the case 12 that is welded to the first plate 30 at the rib 371 is also electrically connected to the negative electrode uncoated region 221 such that the case 12 functions as a negative terminal. However, other embodiments of the present invention are not limited thereto, and the case 12 may alternatively function as a positive electrode terminal and the terminal 14 may function as the negative terminal.

Figure 3B:
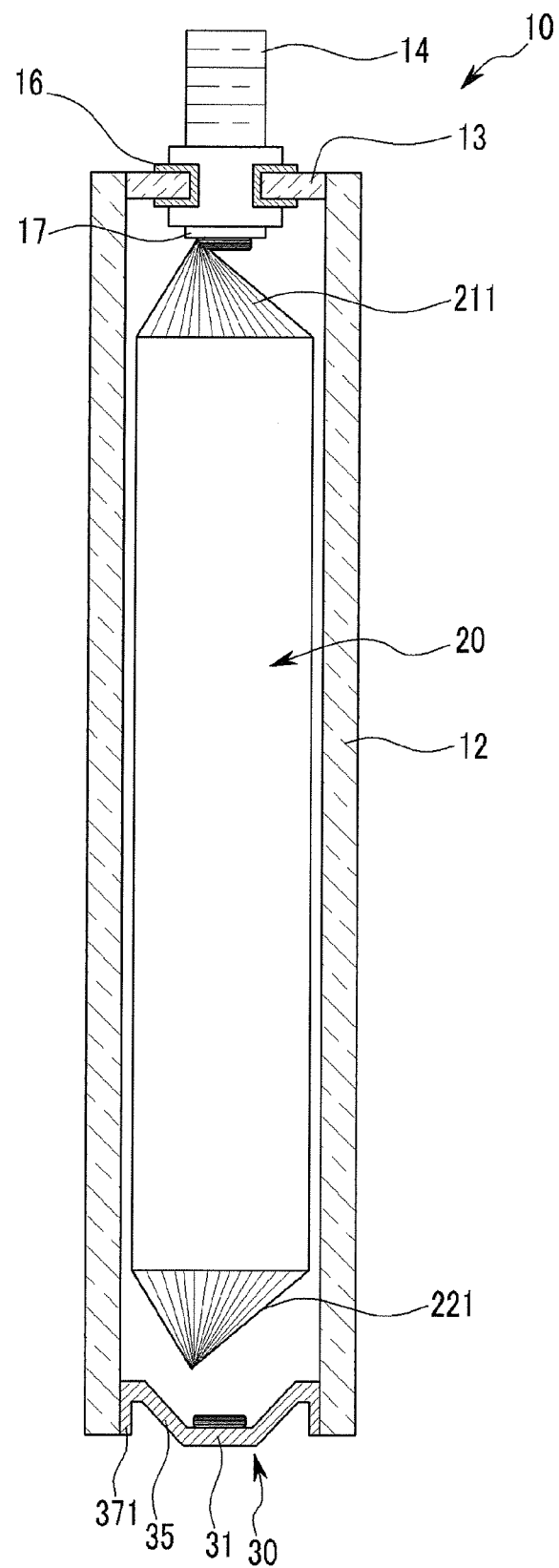
FIG. 3B is a cross-sectional view of the rechargeable battery of FIG. 1 taken along the line III-III showing the wrinkle portion of the rechargeable battery in an expanded state.

FIG. 3A is a cross-sectional view of the rechargeable battery 10 taken along the line III-III of FIG. 1 showing the wrinkle portion 35 in a non-expanded state, and FIG. 3B is a cross-sectional view of the rechargeable battery 10 taken along the line III-III of FIG. 1 showing the wrinkle portion 35 in an expanded state.

The terminal 14 is installed at the second plate 13 via a gasket 16 such that the terminal 14 is clamped to the second plate 13. A current collecting plate 17 welded to the positive electrode uncoated region 211 is attached to the bottom of the terminal 14 so as to electrically connect the positive electrode uncoated region 211 with the terminal 14.

Also, in one embodiment, a notch 221a is formed at the negative electrode uncoated region 221, and the notch 221a is formed between the welded portion and the coating portion that is coated with the active material. Accordingly, the notch 221a is located further inside the case 12 than the portion of the negative electrode uncoated region 221 that is welded to the first plate 30.

As shown in FIG. 3B, when gas is generated by repeated charging and discharging and the internal pressure of the rechargeable battery 10 is elevated to a reference current interruption pressure (or breakage pressure), the wrinkle portion 35 is expanded, or smoothed out, so that it is changed from the bent, or non-expanded, shape shown in FIG. 3A having the convex and concave portions to a shape that is more flattened. As a result of the wrinkle portion 35 being expanded, the connection portion 31 is moved in a direction toward the outside of the case 12, and the electrical connection between the negative electrode uncoated region 221 and the first plate 30 is thereby broken.

According to one exemplary embodiment, when the internal pressure of the rechargeable battery 10 is increased, the case 12 is elongated so that the current can be easily interrupted. In one embodiment, the breakage pressure of the negative electrode uncoated region 221 can be easily established depending upon a shape and depth of the notch 221a. That is, the shape and depth of the notch 221a may be configured so that current is interrupted at a desired internal pressure in the case 12. Furthermore, due to the welding of the negative electrode uncoated region 221, the structural integrity thereof near the welded region is weakened by the welding heat. As such, in one embodiment, the negative electrode uncoated region 221 is configured to be broken at the weakened region.

Accordingly, in exemplary embodiments, the wrinkle portion 35 of the first plate 30 is changed, such as by expanding or flattening, to interrupt the current such that the current may be easily interrupted without additional structure, components, or members. As a result, the production cost may be reduced and productivity may be improved.

In embodiments of the present invention, the increased pressure is transmitted directly to the first plate 30, and the pressure is applied on the entire surface, or substantially the entire surface, of the first plate 30 so that the current interrupting portion reacts virtually immediately to the inner pressure of the case 12, in contrast to typical conventional structures in which the pressure is applied to a small member.

Figure 4:
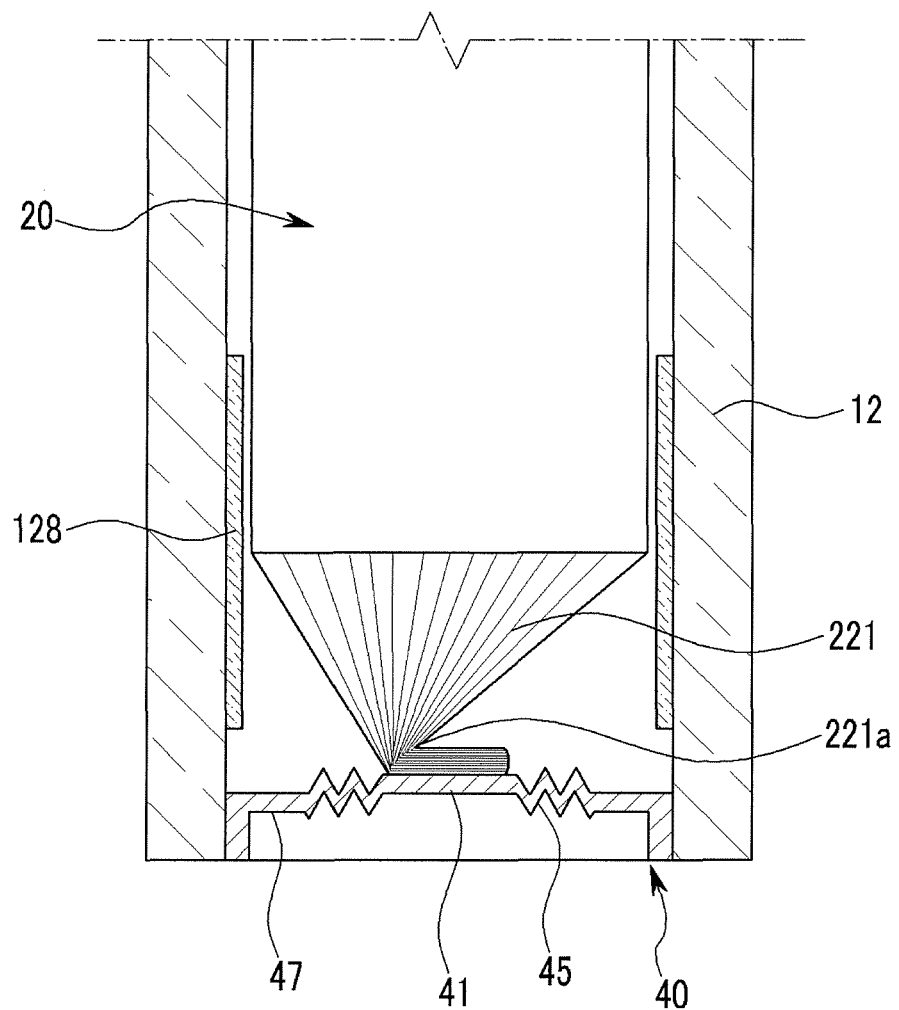
FIG. 4 is a cross-sectional view of a portion of a rechargeable battery according to another exemplary embodiment of the present invention.

FIG. 4 is a cross-sectional view of a portion of a rechargeable battery according to another exemplary embodiment of the present invention. Referring to FIG. 4, a rechargeable battery according to one exemplary embodiment has the same or a similar structure as that of the rechargeable battery 10 described above except for the structure of a first plate 40 instead of the first plate 30. Repeated descriptions of the same structures will be omitted.

The first plate 40 includes a connection portion 41 welded to the negative electrode uncoated region 221, a supporting portion 47 disposed at the edge of the first plate 40 and contacting the case 12, and a wrinkle portion 45 arranged between the connection portion 41 and the supporting portion 47.

Here, the thickness of the wrinkle portion 45 is thinner than that of the connection portion 41 and the supporting portion 47. Accordingly, the wrinkle portion 45 may be easily changed, such as by expanding or flattening the wrinkle portion 45, and the thickness of the connection portion 41 and the supporting portion 47 is thick such that the resistance generated at the first plate 40 may be reduced.

In one embodiment, an insulating layer 128 is formed at the inner surface of the case 12 internal to the insertion region of the first plate 40. The insulating layer 128 is located and arranged to prevent the negative electrode uncoated region 221 and the inside surface of the case 12 from contacting each other in the event that the negative electrode uncoated region 221 is broken and spread.

Figure 5:
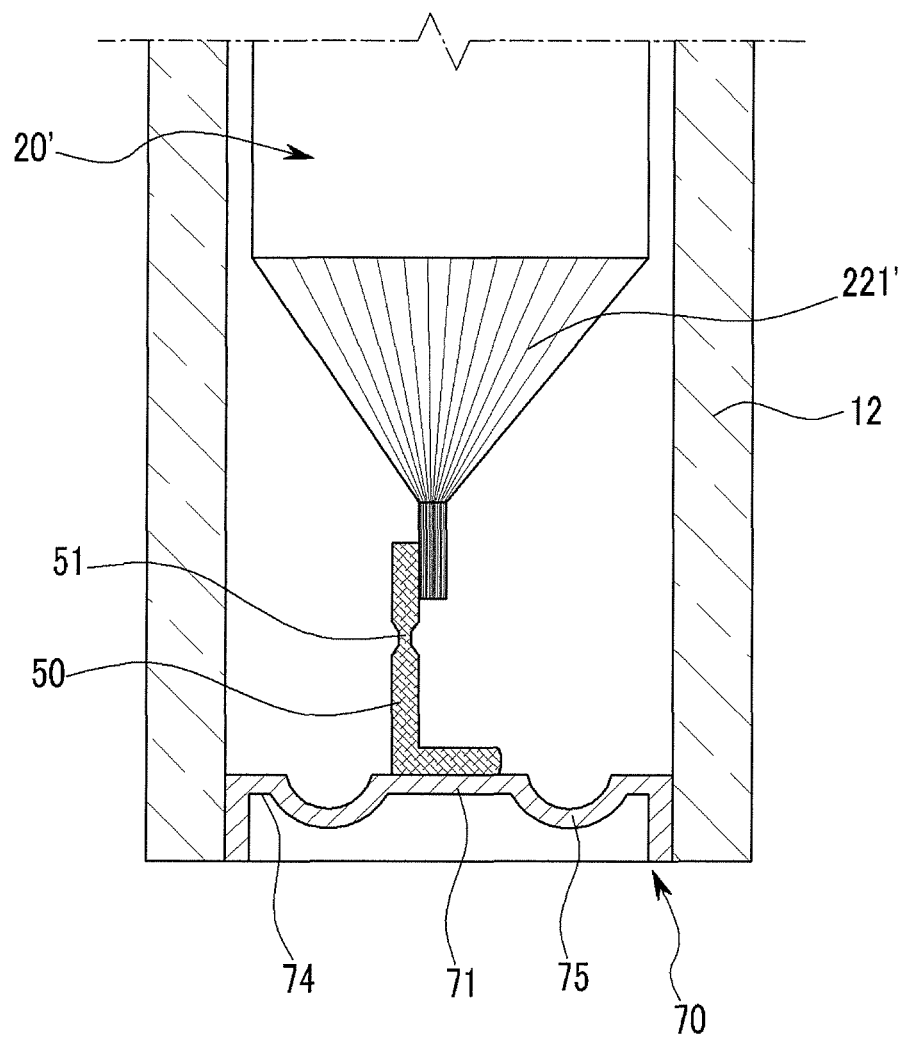
FIG. 5 is a cross-sectional view of a portion of a rechargeable battery according to yet another exemplary embodiment of the present invention.

FIG. 5 is a cross-sectional view of a portion of a rechargeable battery according to yet another exemplary embodiment of the present invention.

Referring to FIG. 5, a rechargeable battery according to one exemplary embodiment has the same or a similar structure as that of the rechargeable battery 10 described above except for a first plate 70, an electrode assembly 20', and a connection structure of the first plate 70 with the electrode assembly 20'. Repeated descriptions of the same structures described above with respect to the rechargeable battery 10 will be omitted.

The first plate 70 includes a connection portion 71 welded to a negative electrode uncoated region 221' of the electrode assembly 20', a supporting portion 74 arranged at the edge and contacting the case 12, and a wrinkle portion 75 arranged between the connection portion 71 and the supporting portion 74. In one embodiment, the wrinkle portion 75 is made of one protrusion and depression and has a structure that is curved convexly toward the outside of the case 12, as shown in FIG. 5. However, embodiments of the present invention are not limited thereto, and, alternatively, the wrinkle portion 75 may be curved toward the inside of the case.

Further, the negative electrode uncoated region 221' is tapered at the center thereof, and is attached to a lead member 50 via welding. The lead member 50 is in turn welded to the first plate 70. Accordingly, the negative electrode uncoated region 221' is electrically connected to the case 12 via the lead member 50 and the first plate 70.

A notch 51 is formed on the lead member 50 such that when the wrinkle portion 75 is smoothed, or expanded, due to an increase of the internal pressure of the case 12, the lead member 50 is broken under a predetermined pressure, or reference pressure, at the notch 51. In this way, when the lead member 50 is broken, the current is interrupted only with the breakage of one member so that the current interruption can be easily made, and the negative electrode uncoated region 221' may also be prevented from contacting the inside wall of the case 12.

Figure 6:
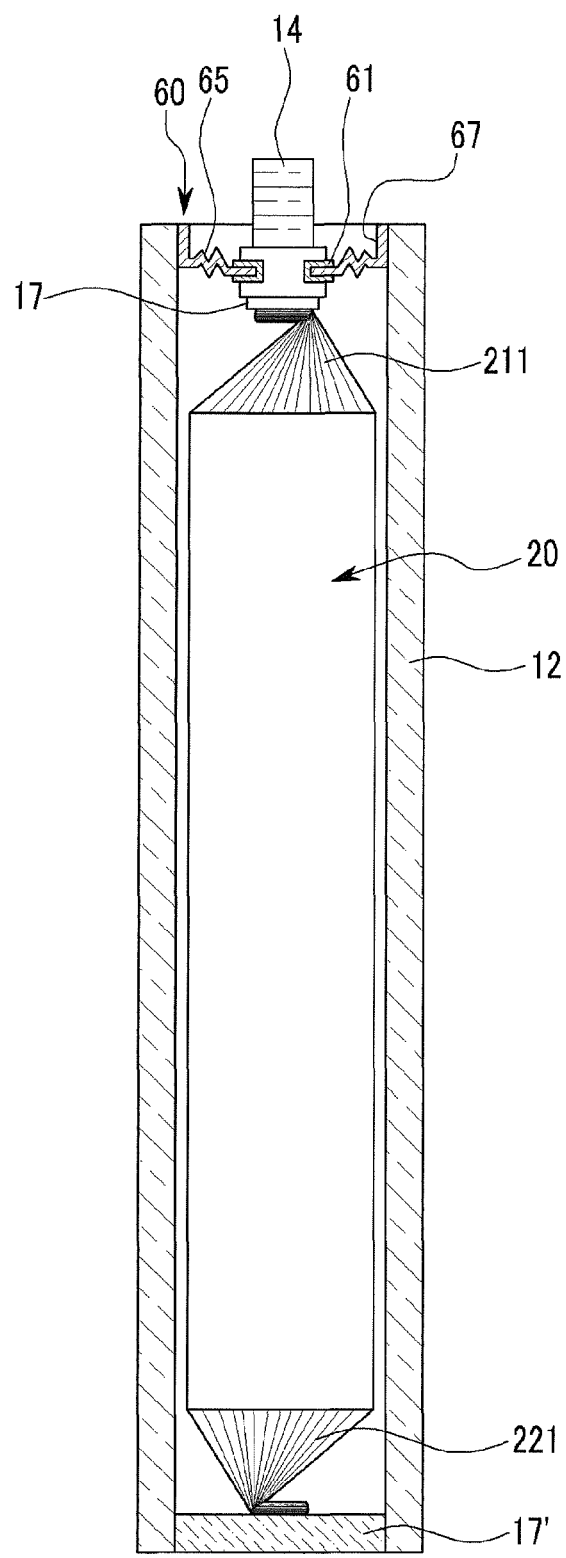
FIG. 6 is a cross-sectional view of a rechargeable battery according to still another exemplary embodiment of the present invention.

FIG. 6 is a cross-sectional view of a rechargeable battery according to still another exemplary embodiment of the present invention.

Referring to FIG. 6, a rechargeable battery according to one exemplary embodiment has the same or a similar structure as that of the rechargeable battery 10 described above except for a second plate 60. Repeated descriptions of the same or similar structures and components described above with respect to the rechargeable battery 10 will be omitted.

The terminal 14 is fitted to the central part of the second plate 60 via a gasket 61, a curved wrinkle portion 65 of the second plate 60 is formed around the terminal 14, and a supporting portion 67 contacting the case 12 is formed outside of the wrinkle portion 65. In one embodiment, the wrinkle portion 65 includes a plurality of protrusions and depressions (or convex and concave portions), and the protrusions and depressions are arranged consecutively, or adjacent one another. Also, the wrinkle portion 65 is arranged in a circumferential direction around the terminal 14. The current collecting plate 17 welded to the positive electrode uncoated region 211 is attached under the terminal 14, thereby electrically connecting the terminal 14 and the positive electrode uncoated region 211 to each other. In one embodiment, a current collecting plate 17' is coupled to and encloses an end of the case 12 opposite the terminal 14, and further is electrically connected to the negative electrode uncoated region 221, such as via welding.

In one embodiment, the positive electrode uncoated region 211 includes a notch, similar to the notch 221a of the negative electrode uncoated region 221 described above with respect to the rechargeable battery 10, the notch located between the welded portion and the coating portion coated by the active material. Accordingly, the notch is located further inside the case 12 than the portion of the positive electrode uncoated region 211 that is welded to the second plate 60.

If gas is generated due to repeated charging and discharging, and the internal pressure of the case 12 is elevated, the pressure is applied to the second plate 60 such that the second plate 60 is expanded at the wrinkle portion 65. If a pressure greater than a predetermined value, or reference pressure, is applied to the second plate 60, the positive electrode uncoated region 211 is broken when the wrinkle portion 65 is deformed, or expanded, and, as a result, the wrinkle portion 65 is further flattened when the terminal 14 is moved upward. As a result of the wrinkle portion 65 being formed at the second plate 60 coupled to the terminal 14, current may be easily interrupted under the predetermined pressure, or reference pressure, condition.

The portion of the second plate 60 that is coupled with the terminal 14 has relatively greater strength than the other portions, and thus it is configured to not easily be deformed under the large pressure. Accordingly, the second plate 60 is configured such that it is prevented from deforming and interrupting the current at a pressure less than the predetermined pressure.

While this invention has been described in connection with what are presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   an electrode assembly comprising a positive electrode, a negative electrode, and a separator between the positive electrode and the negative electrode, a first electrode of the positive and negative electrodes including a coating portion coated with an active material;
   a case containing the electrode assembly therein and having a first opening at one end thereof;
   a first plate coupled to the case and sealing the first opening, the first plate having a through hole at a central part of the first plate; and
   a terminal protruding to an interior of the case through the through hole of the plate and electrically connected to the first electrode through a welded portion,
   wherein the first plate comprises a wrinkle portion surrounding the through hole and deforming and disconnecting the terminal from the first electrode at a region spaced apart from the terminal between the welded portion and the coating portion when an internal pressure of the case is greater than a reference pressure, and
   the wrinkle portion is deformed and the terminal is moved in the direction outside of the case so that an uncoated region having a notch and no active material coating is broken and disconnected from the terminal when the internal pressure of the case is greater than the reference pressure,
   wherein the wrinkle portion comprises at least one protrusion and at least one depression, the at least one protrusion and the at least one depression adjacent one another.

2. The rechargeable battery of claim 1, wherein the first plate further comprises a supporting portion welded to the case near the first opening, and wherein the wrinkle portion is between the supporting portion and the connection portion.

3. The rechargeable battery of claim 2, wherein the wrinkle portion is contiguous around a periphery of the connection portion.

4. The rechargeable battery of claim 1, wherein the wrinkle portion has a thinner thickness than a thickness of another portion of the first plate adjacent the wrinkle portion.

5. The rechargeable battery of claim 1, wherein the case has a second opening at another end thereof opposite the first opening, and wherein the rechargeable battery further comprises a second plate coupled to the case and sealing the second opening.

6. The rechargeable battery of claim 1, wherein the at least one protrusion comprises a plurality of protrusions and the at least one depression comprises a plurality of depressions, protrusions of the plurality of protrusions and depressions of the plurality of depressions adjacent one another.

7. The rechargeable battery of claim 1, further comprising a lead member electrically connected to the electrode assembly and welded to the first plate.

8. The rechargeable battery of claim 7, wherein the lead member has the notch.

9. The rechargeable battery of claim 7, wherein the lead member breaks and disconnects the first plate from the electrode assembly when the first plate deforms.

10. The rechargeable battery of claim 1, further comprising an insulator on an inner surface of the case near the first plate.

11. The rechargeable battery of claim 1, wherein the case has a prismatic shape.

12. The rechargeable battery of claim 1, wherein the wrinkle portion is arranged in a circumferential direction around the terminal.

* * * * *